(12) United States Patent
Uchida et al.

(10) Patent No.: US 10,627,255 B2
(45) Date of Patent: *Apr. 21, 2020

(54) POSITION DETECTION DEVICE

(71) Applicant: TDK CORPORATION, Tokyo (JP)

(72) Inventors: Keisuke Uchida, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 15/892,875

(22) Filed: Feb. 9, 2018

(65) Prior Publication Data

US 2018/0274945 A1    Sep. 27, 2018

(30) Foreign Application Priority Data

Mar. 24, 2017    (JP) .................................. 2017-059938

(51) Int. Cl.
*G01D 5/14*    (2006.01)

(52) U.S. Cl.
CPC .................................. *G01D 5/145* (2013.01)

(58) Field of Classification Search
CPC .. G01R 31/371; G01R 33/072; G01R 33/091; G01D 5/145; G01D 5/12; G01D 5/16; G01D 5/202; G01D 5/2046; G11B 7/0935
See application file for complete search history.

(56) References Cited

U.S. PATENT DOCUMENTS

| | | | |
|---|---|---|---|
| 4,837,537 A * | 6/1989 | Nakada | H01H 36/0013 335/153 |
| 5,561,368 A | 10/1996 | Dovek et al. | |
| 8,446,147 B2 * | 5/2013 | Chiba | A61B 1/00158 324/207.12 |
| 10,006,789 B2 * | 6/2018 | Mochizuki | G01D 5/145 |

(Continued)

FOREIGN PATENT DOCUMENTS

| | | |
|---|---|---|
| JP | 2006-208252 A | 8/2006 |
| JP | 2007-218700 A | 8/2007 |

(Continued)

OTHER PUBLICATIONS

Jul. 5, 2019 Office Action Issue for U.S. Appl. No. 16/123,513.

(Continued)

*Primary Examiner* — Vinh P Nguyen
(74) *Attorney, Agent, or Firm* — Oliff PLC

(57) ABSTRACT

A position detection device includes a first magnetic field generation unit for generating a first magnetic field, a second magnetic field generation unit for generating a second magnetic field, and a magnetic sensor. The relative position of the second magnetic field generation unit with respect to the first magnetic field generation unit is variable. The magnetic sensor detects a composite magnetic field of the first and second magnetic fields, and generates a detection signal corresponding to the direction of the detected magnetic field. Varying the relative position of the second magnetic field generation unit with respect to the first (Continued)

magnetic field generation unit varies the strength of the second magnetic field at the detection position. At the detection position, a relative angle formed by the direction of the second magnetic field with the direction of the first magnetic field is greater than 90° and smaller than 180°.

7 Claims, 11 Drawing Sheets

(56) References Cited

U.S. PATENT DOCUMENTS

| | | | | |
|---|---|---|---|---|
| 10,365,121 | B2* | 7/2019 | Wong | .................. G03B 3/10 |
| 2007/0047152 | A1 | 3/2007 | Furukawa et al. | |
| 2007/0188946 | A1 | 8/2007 | Shoji | |
| 2010/0134096 | A1 | 6/2010 | Chiba et al. | |
| 2012/0098529 | A1 | 4/2012 | Kurihara | |
| 2016/0169707 | A1 | 6/2016 | Hirota et al. | |
| 2016/0231528 | A1 | 8/2016 | Wong et al. | |
| 2019/0128698 | A1 | 5/2019 | Umehara et al. | |
| 2019/0128699 | A1* | 5/2019 | Uchida | .................. G01D 5/16 |

FOREIGN PATENT DOCUMENTS

| | | |
|---|---|---|
| JP | 2011-223422 A | 11/2011 |
| JP | 2015-190880 A | 11/2015 |
| JP | 2016-223894 A | 12/2016 |
| WO | 2016/017490 A1 | 2/2016 |

OTHER PUBLICATIONS

Nov. 19, 2019 U.S. Office Action issued U.S. Appl. No. 16/123,513.
Oct. 23, 2019 Office Action issued in Japanese Patent Application No. 2017-210918.

* cited by examiner

POSITION DETECTION DEVICE

BACKGROUND OF THE INVENTION

1. Field of the Invention

The present invention relates to a position detection device that uses a magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an autofocus mechanism incorporated in a smartphone.

U.S. Patent Application Publication No. 2016/0231528A1 discloses a technique of detecting a composite vector with a position sensor in an autofocus mechanism in which a lens is movably coupled to a substrate. The composite vector is generated by interaction between a first magnetic field having a constant strength in a first direction and a second magnetic field in a second direction generated by a magnet that moves with the lens. The second direction is orthogonal to the first direction. According to the technique, the magnitude of the second magnetic field varies according to the lens position, and as a result, the angle that the composite vector forms with the second direction, which will hereinafter be referred to as the composite vector angle, also varies.

The technique disclosed in U.S. Patent Application Publication No. 2016/0231528A1 enables detection of the lens position by detecting the composite vector angle.

According to the technique disclosed in U.S. Patent Application Publication No. 2016/0231528A1, however, the ratio of the amount of variation in the composite vector angle to the amount of variation in the lens position is low, which results in low sensitivity for position detection.

SUMMARY OF THE INVENTION

It is an object of the present invention to provide a position detection device that uses a magnetic sensor and has high sensitivity for position detection.

A position detection device of the present invention includes: a first magnetic field generation unit for generating a first magnetic field; a second magnetic field generation unit for generating a second magnetic field, the second magnetic field generation unit being provided such that its relative position with respect to the first magnetic field generation unit is variable; and a magnetic sensor for detecting a magnetic field to be detected at a predetermined detection position and generating a detection signal corresponding to the direction of the magnetic field detected.

Varying the relative position of the second magnetic field generation unit with respect to the first magnetic field generation unit does not vary the strength or direction of the first magnetic field at the detection position or the direction of the second magnetic field at the detection position, but varies the strength of the second magnetic field at the detection position. The magnetic field to be detected is a composite magnetic field of the first and second magnetic fields at the detection position. At the detection position, a relative angle formed by the direction of the second magnetic field with the direction of the first magnetic field is greater than 90° and smaller than 180°.

In the position detection device of the present invention, the relative angle may fall within the range of 105° to 165°, or within the range of 105° to 145°.

In the position detection device of the present invention, varying the relative position of the second magnetic field generation unit with respect to the first magnetic field generation unit may vary the distance between the detection position and the second magnetic field generation unit.

In the position detection device of the present invention, the first magnetic field generation unit may include two magnets located at mutually different positions. In this case, the first magnetic field may be a composite of two magnetic fields generated by the two magnets.

The position detection device of the present invention may further include a first holding member for holding the first magnetic field generation unit, and a second holding member for holding the second magnetic field generation unit, the second holding member being provided such that its position is variable in one direction with respect to the first holding member. In such a case, the second holding member may be configured to hold a lens, and may be provided such that its position is variable in a direction of an optical axis of the lens with respect to the first holding member.

According to the position detection device of the present invention, at the detection position, a relative angle formed by the direction of the second magnetic field with the direction of the first magnetic field is greater than 90° and smaller than 180°. By virtue of this feature, the position detection device of the present invention provides high sensitivity for position detection.

Other and further objects, features and advantages of the present invention will appear more fully from the following description.

DETAILED DESCRIPTION OF THE PREFERRED EMBODIMENTS

First Embodiment

Figure 1:
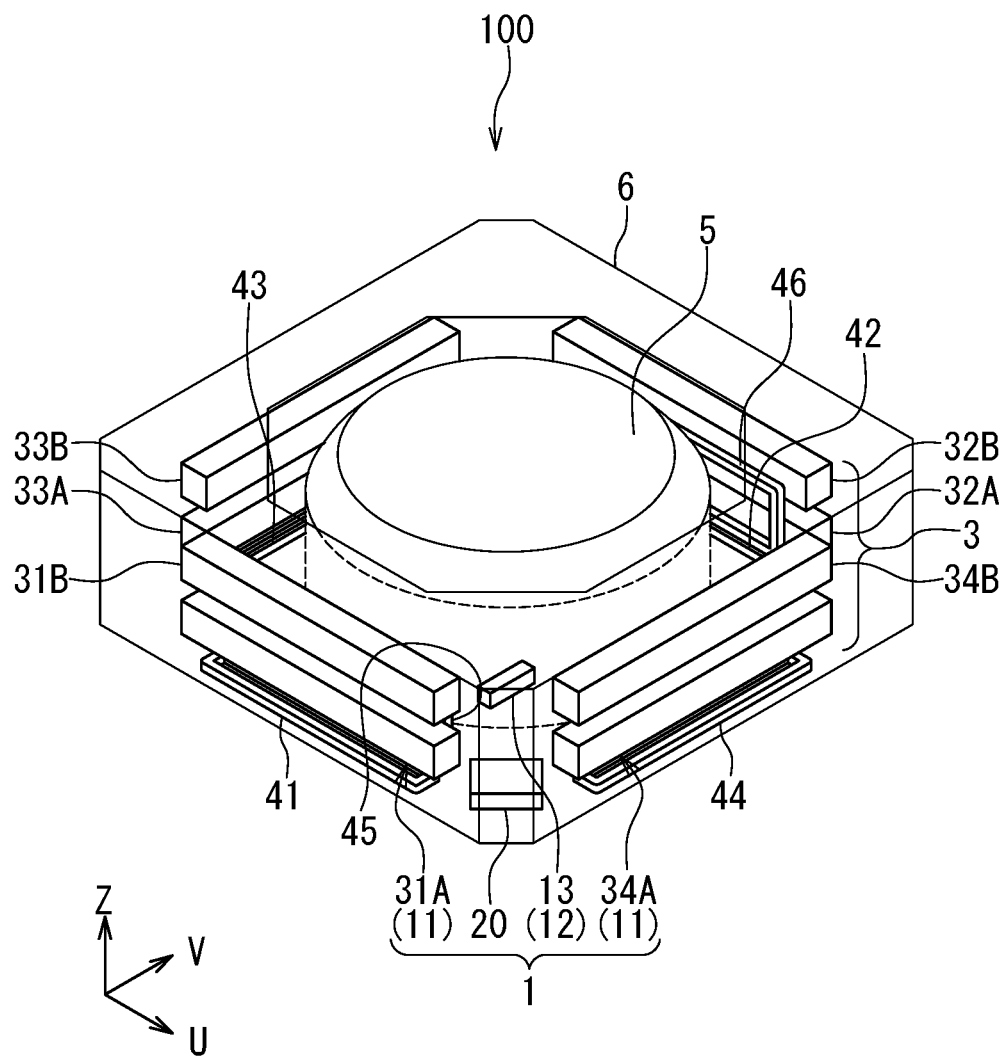
FIG. 1 is a perspective view of a camera module including a position detection device according to a first embodiment of the invention.
Figure 2:
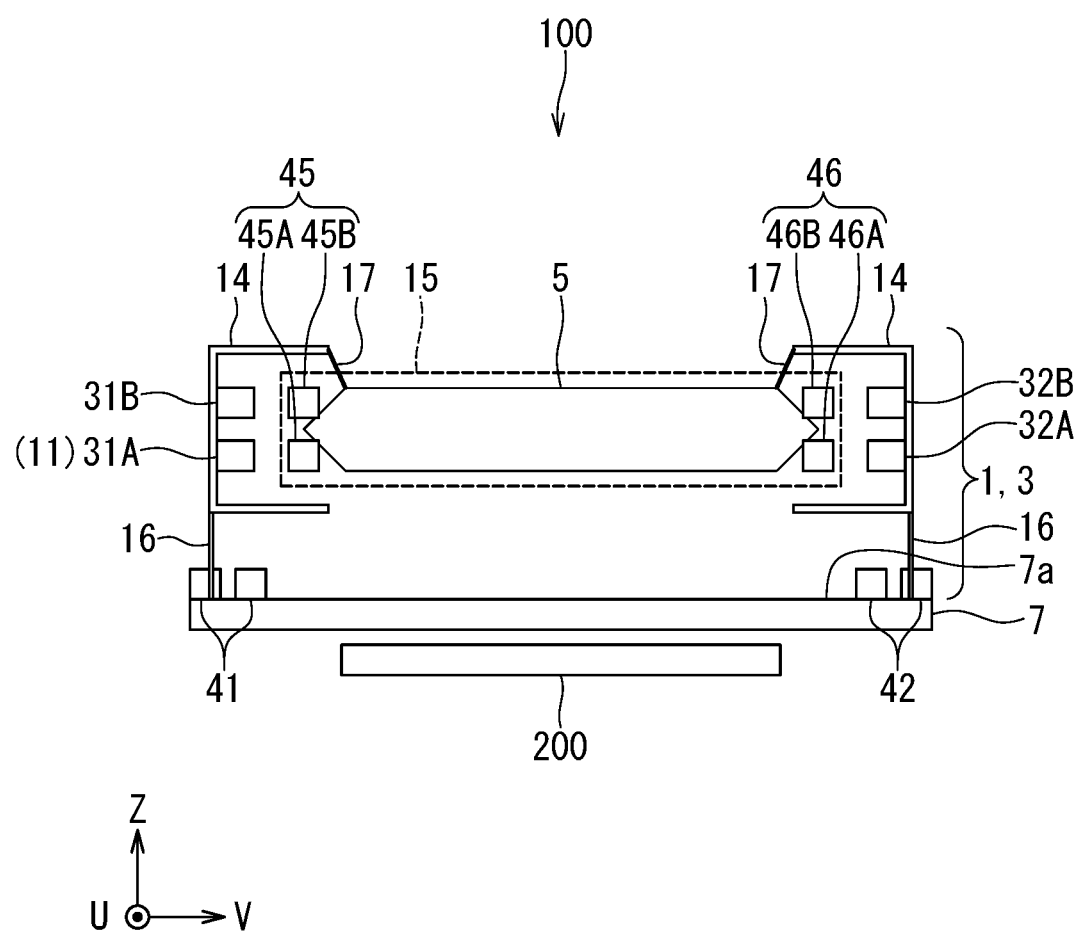
FIG. 2 shows an internal schematic view of the camera module of FIG. 1.

Preferred embodiments of the present invention will now be described in detail with reference to the drawings. First, reference is made to FIG. 1 and FIG. 2 to describe the configuration of a camera module including a position detection device according to a first embodiment of the invention. FIG. 1 is a perspective view of the camera module 100. FIG. 2 is a schematic internal view of the camera module 100. For ease of understanding, in FIG. 2 the parts of the cameral module 100 are drawn on a different scale and in a different layout than those in FIG. 1. The camera module 100 constitutes, for example, a portion of a camera for a smartphone having an optical image stabilization mechanism and an autofocus mechanism, and is used in combination with an image sensor 200 that uses CMOS or other similar techniques.

The camera module 100 includes a position detection device 1 according to the present embodiment, a driving device 3, a lens 5, a housing 6, and a substrate 7. The position detection device 1 according to the present embodiment is a magnetic position detection device, and is used to detect the position of the lens 5 during automatic focusing. The driving device 3 is to move the lens 5. The housing 6 is to protect the position detection device 1 and the driving device 3. The substrate 7 has a top surface 7a. FIG. 1 omits the illustration of the substrate 7, and FIG. 2 omits the illustration of the housing 6.

Now, we define U, V, and Z directions as shown in FIG. 1 and FIG. 2. The U, V, and Z directions are orthogonal to one another. In the present embodiment, the Z direction is a direction perpendicular to the top surface 7a of the substrate 7. In FIG. 2, the Z direction is the upward direction. The U and V directions are both parallel to the top surface 7a of the substrate 7. Further, −U, −V, and −Z directions refer to directions that are opposite to the U, V, and Z directions, respectively. As used herein, the term "above" refers to positions located forward of a reference position in the Z direction, and "below" refers to positions located on a side of the reference position opposite to "above".

The lens 5 is disposed above the top surface 7a of the substrate 7 in such an orientation that the direction of its optical axis is parallel to the Z direction. The substrate 7 has an opening (not illustrated) for passing light that has passed through the lens 5. As shown in FIG. 2, the camera module 100 is in alignment with the image sensor 200 so that light that has passed through the lens 5 and the non-illustrated opening will enter the image sensor 200.

Figure 3:
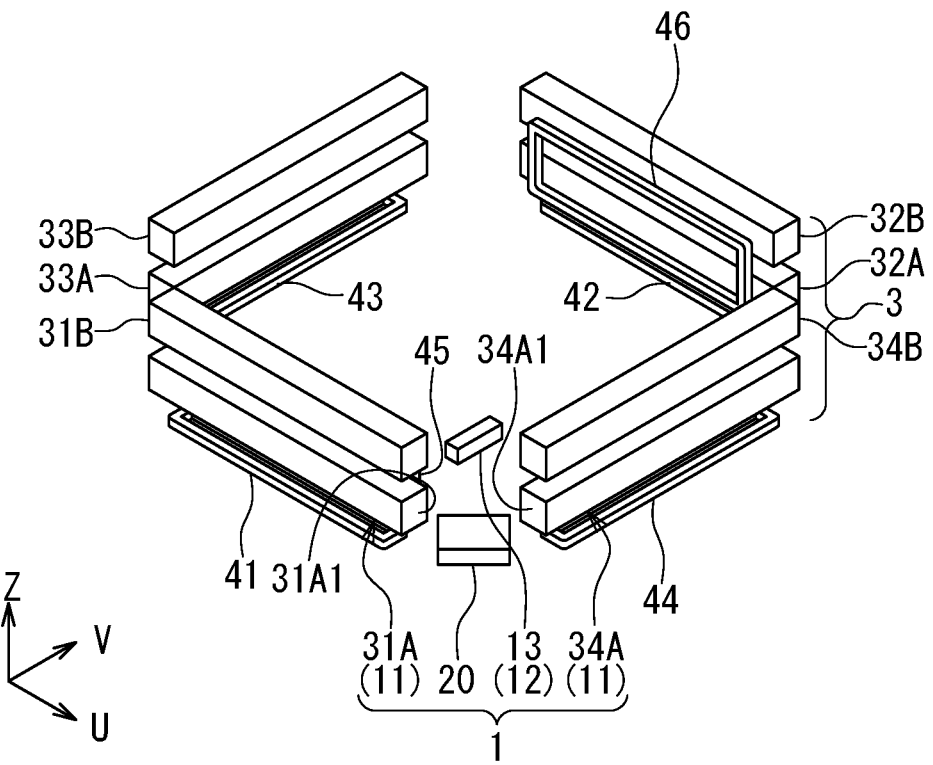
FIG. 3 is a perspective view of the position detection device and a driving device according to the first embodiment of the invention.
Figure 4:
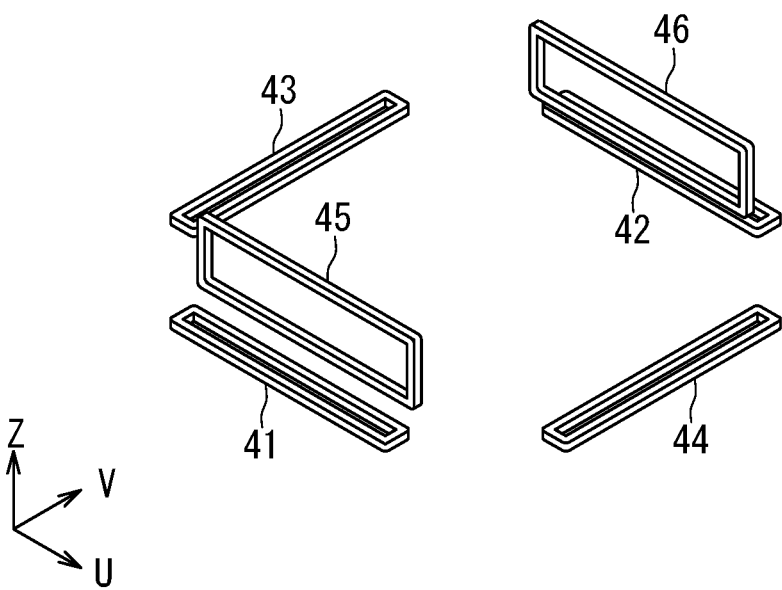
FIG. 4 is a perspective view of a plurality of coils of the driving device of FIG. 1.
Figure 5:
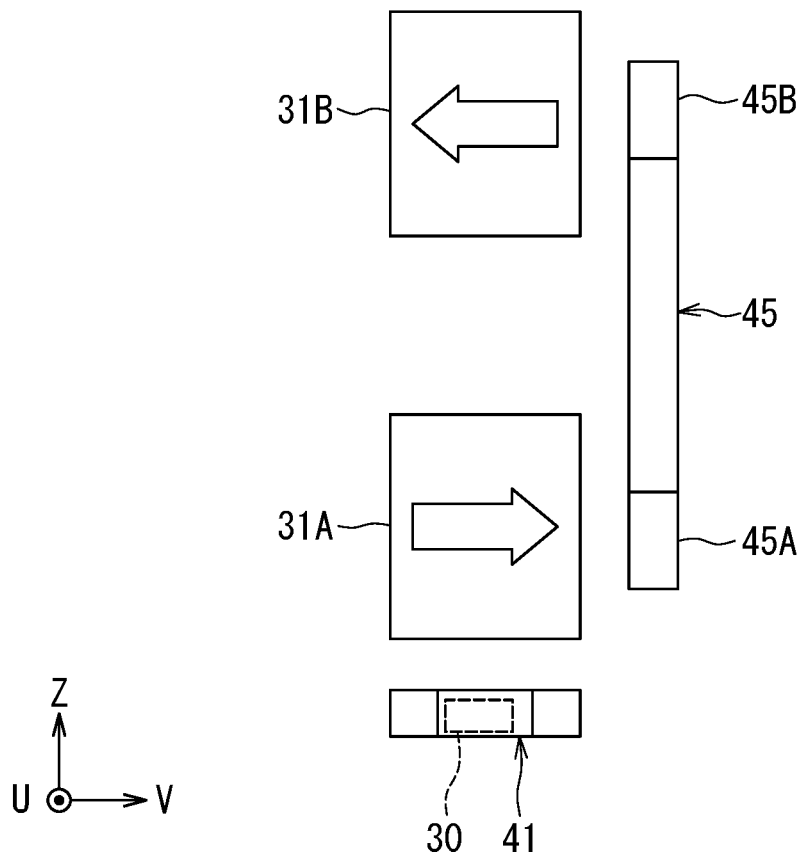
FIG. 5 is a side view illustrating the principal parts of the driving device of FIG. 1.

The position detection device 1 and the driving device 3 according to the present embodiment will now be described in detail with reference to FIG. 2 to FIG. 5. FIG. 3 is a perspective view of the position detection device 1 and the driving device 3. FIG. 4 is a perspective view of a plurality of coils of the driving device 3. FIG. 5 is a side view illustrating the principal parts of the driving device 3.

The position detection device 1 includes a first holding member 14, a second holding member 15, a plurality of first wires 16, and a plurality of second wires 17. The second holding member 15 is to hold the lens 5. Although not illustrated, the second holding member 15 is shaped like a hollow cylinder so that the lens 5 is insertable in the hollow.

The second holding member 15 is provided such that its position is variable in one direction, specifically, in the direction of the optical axis of the lens 5, i.e., a direction parallel to the Z direction, with respect to the first holding member 14. In the present embodiment, the first holding member 14 is shaped like a box so that the lens 5 and the second holding member 15 can be accommodated therein. The plurality of second wires 17 connect the first and second holding members 14 and 15 and support the second holding member 15 such that the second holding member 15 is movable in a direction parallel to the Z direction with respect to the first holding member 14.

The first holding member 14 is provided above the top surface 7a of the substrate 7 such that its position is variable with respect to the substrate 7 in a direction parallel to the U direction and in a direction parallel to the V direction. The plurality of first wires 16 connect the substrate 7 and the first holding member 14, and support the first holding member 14 such that the first holding member 14 is movable with respect to the substrate 7 in the directions parallel to the U direction and parallel to the V direction. Varying the relative position of the first holding member 14 with respect to the substrate 7 varies the relative position of the second holding member 15 with respect to the substrate 7.

The driving device 3 includes magnets 31A, 31B, 32A, 32B, 33A, 33B, 34A and 34B, and coils 41, 42, 43, 44, 45 and 46. The magnet 31A is located forward of the lens 5 in the −V direction. The magnet 32A is located forward of the lens 5 in the V direction. The magnet 33A is located forward of the lens 5 in the −U direction. The magnet 34A is located forward of the lens 5 in the U direction. The magnets 31B, 32B, 33B and 34B are located above the magnets 31A, 32A, 33A and 34A, respectively. The magnets 31A, 31B, 32A, 32B, 33A, 33B, 34A and 34B are fixed to the first holding member 14.

As shown in FIG. 3, the magnets 31A, 31B, 32A and 32B are each shaped like a rectangular solid elongated in the U direction. The magnets 33A, 33B, 34A and 34B are each shaped like a rectangular solid elongated in the V direction. The magnets 31A and 32B are magnetized in the V direction. The magnets 31B and 32A are magnetized in the −V direction. The magnets 33A and 34B are magnetized in the U direction. The magnets 33B and 34A are magnetized in the −U direction. In FIG. 5, the arrows drawn within the magnets 31A and 31B indicate the magnetization directions of the magnets 31A and 31B.

The coil 41 is located between the magnet 31A and the substrate 7. The coil 42 is located between the magnet 32A and the substrate 7. The coil 43 is located between the magnet 33A and the substrate 7. The coil 44 is located between the magnet 34A and the substrate 7. The coil 45 is located between the lens 5 and the magnets 31A and 31B. The coil 46 is located between the lens 5 and the magnets 32A and 32B. The coils 41, 42, 43 and 44 are fixed to the substrate 7. The coils 45 and 46 are fixed to the second holding member 15.

The coil 41 is subjected mainly to a magnetic field generated by the magnet 31A. The coil 42 is subjected mainly to a magnetic field generated by the magnet 32A. The coil 43 is subjected mainly to a magnetic field generated by the magnet 33A. The coil 44 is subjected mainly to a magnetic field generated by the magnet 34A.

As shown in FIGS. 2, 4 and 5, the coil 45 includes a first conductor portion 45A extending along the magnet 31A in the U direction, a second conductor portion 45B extending along the magnet 31B in the U direction, and two third conductor portions connecting the first and second conductor portions 45A and 45B. As shown in FIGS. 2 and 4, the coil 46 includes a first conductor portion 46A extending along the magnet 32A in the U direction, a second conductor portion 46B extending along the magnet 32B in the U direction, and two third conductor portions connecting the first and second conductor portions 46A and 46B.

The first conductor portion 45A of the coil 45 is subjected mainly to a component in the V direction of the magnetic field generated by the magnet 31A. The second conductor portion 45B of the coil 45 is subjected mainly to a component in the −V direction of a magnetic field generated by the magnet 31B. The first conductor portion 46A of the coil 46 is subjected mainly to a component in the −V direction of the magnetic field generated by the magnet 32A. The second conductor portion 46B of the coil 46 is subjected mainly to a component in the V direction of a magnetic field generated by the magnet 32B.

The position detection device 1 further includes a first magnetic field generation unit 11 for generating a first magnetic field MF1, a second magnetic field generation unit 12 for generating a second magnetic field MF2, and a magnetic sensor 20. In the present embodiment, the first magnetic field generation unit 11 has two magnets located at mutually different positions. In the present embodiment, the first magnetic field generation unit 11 particularly has the magnets 31A and 34A as the aforementioned two magnets. The first magnetic field MF1 is a composite of the magnetic fields generated by the magnets 31A and 34A. A mentioned above, the magnets 31A and 34A are fixed to the first holding member 14. The first magnetic field generation unit 11 is thus held by the first holding member 14.

As shown in FIG. 3, the magnet 31A has an end face 31A1 located at the end of the magnet 31A in the U direction. The magnet 34A has an end face 34A1 located at the end of the magnet 34A in the −V direction.

The second magnetic field generation unit 12 is provided such that its relative position with respect to the first magnetic field generation unit 11 is variable. In the present embodiment, the second magnetic field generation unit 12 has a magnet 13. The second magnetic field MF2 is a magnetic field generated by the magnet 13. The magnet 13 is shaped like a rectangular solid. The magnet 13 is fixed to the second holding member 15 in a space near the end face 31A1 of the magnet 31A and the end face 34A1 of the magnet 34A. The second magnetic field generation unit 12 is thus held by the second holding member 15. When the relative position of the second holding member 15 with respect to the first holding member 14 varies in a direction parallel to the Z direction, the relative position of the second magnetic field generation unit 12 with respect to the first magnetic field generation unit 11 also varies in the direction parallel to the Z direction.

The magnetic sensor 20 detects a magnetic field to be detected at a predetermined detection position and generates a detection signal corresponding to the direction of the magnetic field detected. The magnetic sensor 20 is fixed to the substrate 7 in the vicinity of the end face 31A1 of the magnet 31A and the end face 34A1 of the magnet 34A. The distance between the magnet 31A and the magnetic sensor 20 is equal to the distance between the magnet 34A and the magnetic sensor 20. The magnet 13 is located above the magnetic sensor 20.

Figure 6:
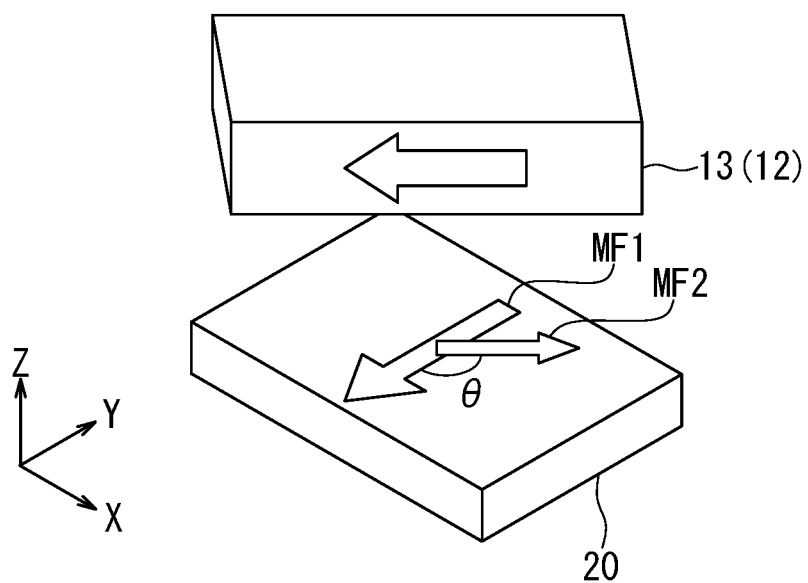
FIG. 6 is a perspective view illustrating the principal parts of the position detection device according to the first embodiment of the invention.
Figure 9:
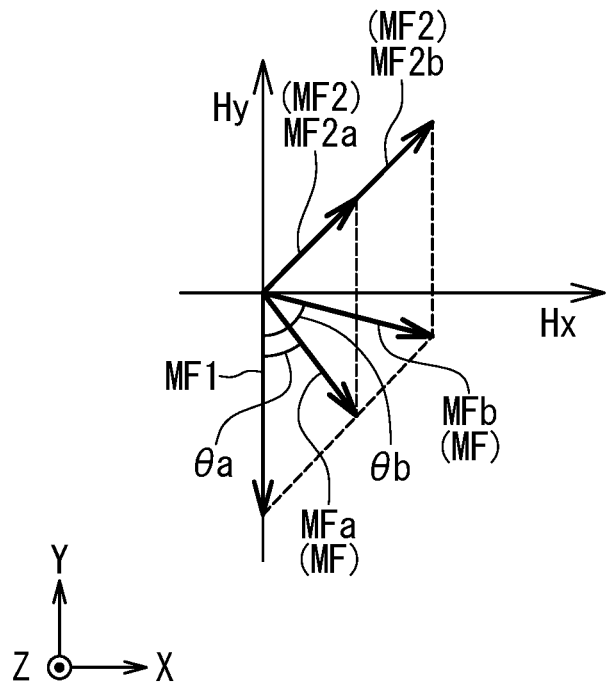
FIG. 9 is an explanatory diagram illustrating a first magnetic field, a second magnetic field, and a composite magnetic field of the first embodiment of the invention.

In the present embodiment, the predetermined detection position is the position at which the magnetic sensor 20 is disposed. As mentioned previously, varying the relative position of the second magnetic field generation unit 12 with respect to the first magnetic field generation unit 11 varies the distance between the detection position and the second magnetic field generation unit 12. The magnetic field to be detected is a composite magnetic field MF of the first magnetic field MF1 and the second magnetic field MF2 at the detection position. The first and second magnetic fields MF1 and MF2 are shown in FIG. 6 to be described later. The composite magnetic field MF is shown in FIG. 9 to be described later.

The positional relationships between the first magnetic field generation unit 11, the second magnetic field generation unit 12 and the magnetic sensor 20, and the configuration of the magnetic sensor 20 will be described in more detail later.

The driving device 3 further includes four magnetic sensors 30 respectively located inside the coils 41 to 44 and fixed to the substrate 7. As will be described later, the four magnetic sensors 30 are used to vary the position of the lens 5 to reduce the effect of hand-induced camera shake.

The magnetic sensor 30 located inside the coil 41 detects the magnetic field generated by the magnet 31A and generates a signal corresponding to the position of the magnet 31A. The magnetic sensor 30 located inside the coil 42 detects the magnetic field generated by the magnet 32A and generates a signal corresponding to the position of the magnet 32A. The magnetic sensor 30 located inside the coil 43 detects the magnetic field generated by the magnet 33A and generates a signal corresponding to the position of the magnet 33A. The magnetic sensor 30 located inside the coil 44 detects the magnetic field generated by the magnet 34A and generates a signal corresponding to the position of the magnet 34A. The magnetic sensors 30 are constructed of elements for detecting magnetic fields, such as Hall elements. The driving device 3 may be provided with only either one of the magnetic sensor 30 inside the coil 41 and the magnetic sensor 30 inside the coil 42. Likewise, the driving device 3 may be provided with only either one of the magnetic sensor 30 inside the coil 43 and the magnetic sensor 30 inside the coil 44.

The positional relationships between the first magnetic field generation unit 11, the second magnetic field generation unit 12 and the magnetic sensor 20 will now be described in detail. FIG. 6 is a perspective view illustrating the principal parts of the position detection device 1. Here, X and Y directions are defined as shown in FIG. 6. Both the X and Y directions are parallel to the top surface 7a (see FIG. 2) of the substrate 7. The X direction is the direction rotated by 45° from the U direction toward the V direction. The Y direction is the direction rotated by 45° from the V direction toward the −U direction. Further, −X direction is the direction opposite to the X direction, and −Y direction is the direction opposite to the Y direction.

In FIG. 6, the arrow MF1 represents the first magnetic field MF1 at the detection position. In the present embodiment, the first magnetic field generation unit 11 and the magnetic sensor 20 are provided such that the first magnetic field MF1 at the detection position is in the −Y direction. The direction of the first magnetic field MF1 at the detection position is adjustable by adjusting, for example, the positional relationships of the magnets 31A and 34A with respect to the magnetic sensor 20 and the orientations of the magnets 31A and 34A. The magnets 31A and 34A are preferably placed to be symmetric with respect to the YZ plane including the detection position.

In FIG. 6, the arrow MF2 represents the second magnetic field MF2 at the detection position, and the arrow drawn within the magnet 13 represents the magnetization of the magnet 13. The symbol θ represents a relative angle formed by the direction of the second magnetic field MF2 with the direction of the first magnetic field MF1 at the detection position. The relative angle θ is expressed in values within the range of 0° to 180°.

In the present embodiment, the first magnetic field generation unit 11, the second magnetic field generation unit 12 and the magnetic sensor 20 are provided such that the relative angle θ is greater than 90° and smaller than 180°. The relative angle θ is adjustable by adjusting the orientation of the magnet 13, for example. FIG. 6 illustrates an example in which the relative angle θ is set at 135°. In this example, the magnet 13 is disposed in such an orientation that the magnetization of the magnet 13 is in the direction rotated by 45° from the −X direction toward the −Y direction.

Figure 7:
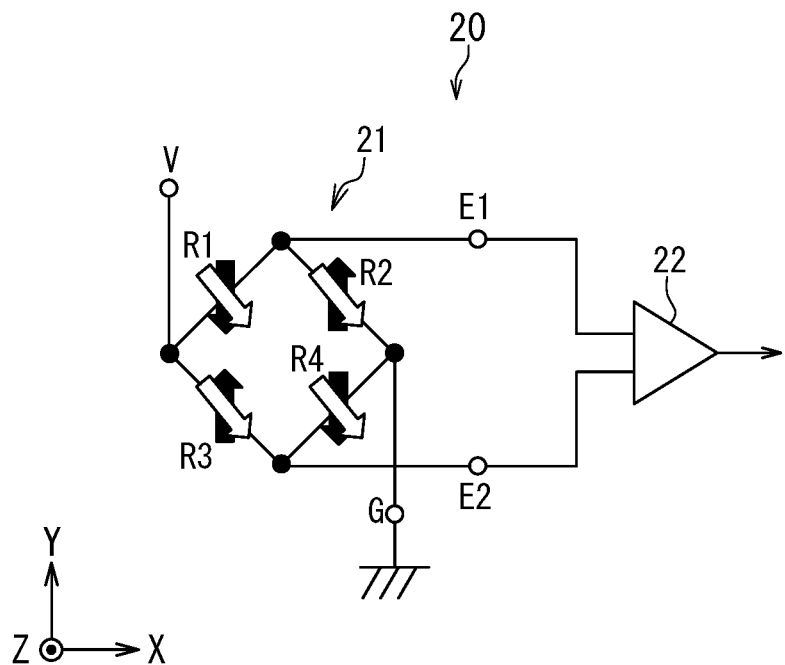
FIG. 7 is a circuit diagram illustrating the configuration of a magnetic sensor of the first embodiment of the invention.

The configuration of the magnetic sensor 20 will now be described with reference to FIG. 7. FIG. 7 is a circuit diagram illustrating the configuration of the magnetic sensor 20. In the present embodiment, the magnetic sensor 20 is configured to generate, as a detection signal corresponding to the direction of the magnetic field detected, a detection signal corresponding to an angle that the direction of the composite magnetic field MF forms with a reference direction. The reference direction is the direction of the first magnetic field MF1, that is, the −Y direction.

As shown in FIG. 7, the magnetic sensor 20 includes a Wheatstone bridge circuit 21 and a difference detector 22. The Wheatstone bridge circuit 21 includes a power supply port V, a ground port two output ports E1 and E2, a first pair of serially connected magnetic detection elements R1 and R2, and a second pair of serially connected magnetic detection elements R3 and R4. One end of each of the magnetic detection elements R1 and R3 is connected to the power supply port V. The other end of the magnetic detection element R1 is connected to one end of the magnetic detection element R2 and the output port E1. The other end of the magnetic detection element R3 is connected to one end of the magnetic detection element R4 and the output port E2. The other end of each of the magnetic detection elements R2 and R4 is connected to the ground port G A power supply voltage of predetermined magnitude is applied to the power supply port V. The ground port G is grounded.

In the present embodiment, each of the magnetic detection elements R1 to R4 includes a plurality of magnetoresistive (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies according to the direction of the magnetic field to be detected, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance according to the angle that the magnetization direction of the free layer forms with the magnetization direction of the magnetization pinned layer, and has a minimum resistance when the foregoing angle is 0° and a maximum resistance when the foregoing angle is 180°. In FIG. 7, the filled arrows indicate the magnetization directions of the magnetization pinned layers of the MR elements, and the hollow arrows indicate the magnetization directions of the free layers of the MR elements.

The magnetization pinned layers of the MR elements included in the magnetic detection elements R1 and R4 are magnetized in the −Y direction, and the magnetization pinned layers of the MR elements included in the magnetic detection elements R2 and R3 are magnetized in the Y direction. In this case, the potential difference between the output ports E1 and E2 varies according to the cosine of the angle that the direction of the composite magnetic field MF forms with the −Y direction. The difference detector 22 outputs a signal corresponding to the potential difference between the output ports E1 and E2 as a detection signal. The magnetic sensor 20 thus detects the composite magnetic field MF and generates a detection signal corresponding to the cosine of the angle that the direction of the composite magnetic field MF forms with the −Y direction.

In the light of the production accuracy of the MR elements and other factors, the magnetization directions of the magnetization pinned layers of the plurality of MR elements may be slightly different from the above-described directions.

Figure 8:
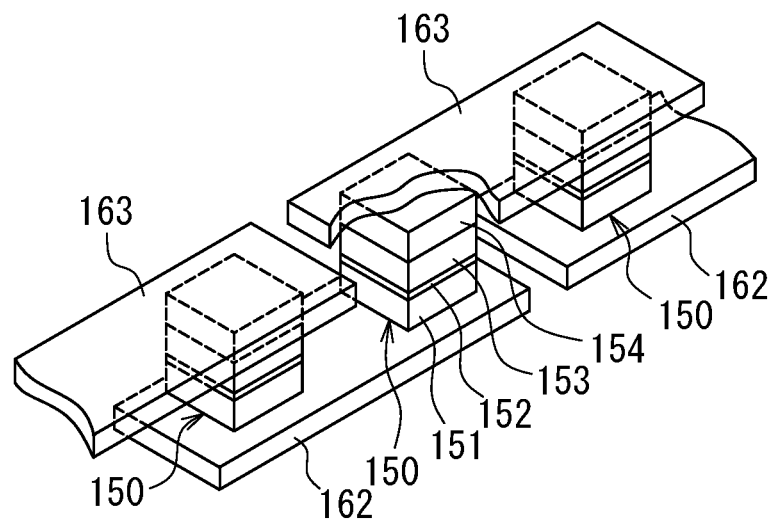
FIG. 8 is a perspective view of a portion of a magnetic detection element of FIG. 7.

An example of the configuration of the magnetic detection elements will now be described with reference to FIG. 8. FIG. 8 is a perspective view illustrating a portion of a magnetic detection element in the magnetic sensor 20 shown in FIG. 7. In this example, the magnetic detection element includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 8, MR elements 150 are provided on the top surfaces of the lower electrodes 162, near opposite ends in the longitudinal direction. Each of the MR elements 150 includes a free layer 151, a nonmagnetic layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the plurality of MR elements 150 in the magnetic detection element shown in FIG. 8 are connected in series by the plurality of lower electrodes 162 and the plurality of upper electrodes 163. It should be appreciated that the layers 151 to 154 of the MR elements 150 may be stacked in the reverse order to that shown in FIG. 8.

Reference is now made to FIG. 2 to FIG. 5 to describe the operation of the driving device 3. The driving device 3 constitutes part of optical image stabilization and autofocus mechanisms. Such mechanisms will be briefly described first. A control unit (not illustrated) external to the camera module 100 controls the driving device 3, the optical image stabilization mechanism and the autofocus mechanism.

The optical image stabilization mechanism is configured to detect hand-induced camera shake using, for example, a gyrosensor external to the camera module 100. Upon detection of hand-induced camera shake by the optical image stabilization mechanism, the non-illustrated control unit controls the driving device 3 so as to vary the relative position of the lens 5 with respect to the substrate 7 depending on the mode of the camera shake. This stabilizes the absolute position of the lens 5 to reduce the effect of the camera shake. The relative position of the lens 5 with respect to the substrate 7 is varied in a direction parallel to the U direction or parallel to the V direction, depending on the mode of the camera shake.

The autofocus mechanism is configured to detect a state in which focus is achieved on the subject, using, for example, an image sensor 200 or an autofocus sensor. Using the driving device 3, the non-illustrated control unit varies the relative position of the lens 5 with respect to the substrate 7 in a direction parallel to the Z direction so as to achieve focus on the subject. This enables automatic focusing on the subject.

Next, a description will be given of the operation of the driving device 3 related to the optical image stabilization mechanism. When currents are passed through the coils 41 and 42 by the non-illustrated control unit, the first holding member 14 with the magnets 31A and 32A fixed thereto moves in a direction parallel to the V direction due to interaction between the magnetic fields generated by the magnets 31A and 32A and the magnetic fields generated by the coils 41 and 42. As a result, the lens 5 also moves in the direction parallel to the V direction. On the other hand, when currents are passed through the coils 43 and 44 by the non-illustrated control unit, the first holding member 14 with the magnets 33A and 34A fixed thereto moves in a direction parallel to the U direction due to interaction between the magnetic fields generated by the magnets 33A and 34A and the magnetic fields generated by the coils 43 and 44. As a result, the lens 5 also moves in the direction parallel to the U direction. The non-illustrated control unit detects the position of the lens 5 by measuring signals corresponding to the positions of the magnets 31A, 32A, 33A and 34A, which are generated by the magnetic sensor 30.

Next, the operation of the driving device 3 related to the autofocus mechanism will be described. To move the relative position of the lens 5 with respect to the substrate 7 in the Z direction, the non-illustrated control unit passes a current through the coil 45 such that the current flows through the first conductor portion 45A in the U direction and flows through the second conductor portion 45B in the −U direction, and passes a current through the coil 46 such that the current flows through the first conductor portion 46A in the −U direction and flows through the second conductor portion 46B in the U direction. These currents and the magnetic fields generated by the magnets 31A, 31B, 32A and 32B cause a Lorentz force in the Z direction to be exerted on the first and second conductor portions 45A and 45B of the coil 45 and the first and second conductor portions 46A and 46B of the coil 46. This causes the second holding member 15 with the coils 45 and 46 fixed thereto to move in the Z direction. As a result, the lens 5 also moves in the Z direction.

To move the relative position of the lens 5 with respect to the substrate 7 in the −Z direction, the non-illustrated control unit passes currents through the coils 45 and 46 in directions opposite to those in the case of moving the relative position in the Z direction.

The function and effects of the position detection device 1 according to the present embodiment will now be described. The position detection device 1 according to the present embodiment is used to detect the position of the lens 5. In the present embodiment, varying the relative position of the lens 5 with respect to the substrate 7 varies the relative position of the second holding member 15 with respect to each of the substrate 7 and the first holding member 14. As previously mentioned, the first holding member 14 holds the first magnetic field generation unit 11, and the second holding member 15 holds the second magnetic field generation unit 12. Thus, varying the relative position of the lens 5 as mentioned above varies the relative position of the second magnetic field generation unit 12 with respect to the first magnetic field generation unit 11. Hereinafter, the relative position of the second magnetic field generation unit 12 with respect to the first magnetic field generation unit 11 will be referred to as the relative position P12. In the present embodiment, the relative position P12 is variable in a direction of the optical axis of the lens 5, that is, in a direction parallel to the Z direction.

Varying the relative position P12 does not vary the relative position of the first magnetic field generation unit 11 with respect to the substrate 7, but varies the relative position of the second magnetic field generation unit 12 with respect to the substrate 7. Thus, varying the relative position P12 does not vary the strength or direction of the first magnetic field MF1 at the detection position or the direction of the second magnetic field MF2 at the detection position, but varies the strength of the second magnetic field MF2 at the detection position. Varying the strength of the second magnetic field MF2 at the detection position varies the direction and strength of the composite magnetic field MF, i.e., the magnetic field to be detected, and accordingly, varies the value of the detection signal to be generated by the magnetic sensor 20. The value of the detection signal varies depending on the relative position P12. The non-illustrated control unit detects the relative position P12 by measuring the detection signal.

Reference is now made to FIG. 9 to describe the strengths and directions of the first magnetic field MF1, the second magnetic field MF2 and the composite magnetic field MF at the detection position. In FIG. 9, the X-directional axis represents the strength Hx of a magnetic field in the X direction, and the Y-directional axis represents the strength Hy of a magnetic field in the Y direction. Hereinafter, the second magnetic field MF2 at the detection position in the case where the distance between the detection position and the second magnetic field generation unit 12 is relatively large will be referred to as a magnetic field MF2a, and the second magnetic field MF2 at the detection position in the case where the distance between the detection position and the second magnetic field generation unit 12 is relatively small will be referred to as a magnetic field MF2b. In FIG. 9, the direction and strength of the magnetic field MF2a are indicated by the direction and length of the arrow labeled MF2a, respectively. In FIG. 9 and other similar figures to be referred to for descriptions below, the direction and strength of other magnetic fields than the magnetic field MF2a are also illustrated in the same manner as those of the magnetic field MF2a. As shown in FIG. 9, the magnetic field MF2b is higher in strength than the magnetic field MF2a. The magnetic field MF2a and the magnetic field MF2b are in the same direction.

FIG. 9 illustrates an example in which the relative angle θ shown in FIG. 6 is 135°. In this example, the angle that the magnetic field MF2a forms with the first magnetic field MF1 at the detection position and the angle that the magnetic field MF2b forms with the first magnetic field MF1 at the detection position are both 135°.

Here, MFa represents a composite magnetic field of the magnetic field MF2a and the first magnetic field MF1 at the detection position; MFb represents a composite magnetic field of the magnetic field MF2b and the first magnetic field MF1 at the detection position; θa represents the angle that the direction of the composite magnetic field MFa forms with the −Y direction, i.e., the reference direction; and θb represents the angle that the direction of the composite magnetic field MFb forms with the −Y direction, i.e., the reference direction. As shown in FIG. 9, the angle θb is greater than the angle θa. Thus, the angle that the direction of the composite magnetic field MF forms with the reference direction varies depending on the strength of the second magnetic field MF2. Further, the strength of the second magnetic field MF2 varies depending on the distance between the detection position and the second magnetic field generation unit 12. Thus, the angle that the direction of the composite magnetic field MF forms with the reference direction varies depending on the distance between the detection position and the second magnetic field generation unit 12.

In the present embodiment, the magnetic sensor 20 generates, as the detection signal corresponding to the direction of the magnetic field detected, a detection signal corresponding to the angle that the direction of the composite magnetic field MF forms with the reference direction. According to the present embodiment, the distance between the detection position and the second magnetic field generation unit 12 can be determined from the detection signal, and this enables detection of the relative position P12.

In the present embodiment, the relative angle θ shown in FIG. 6 is set to the range greater than 90° and smaller than 180°. This enables increasing the amount of variation in the angle that the direction of the composite magnetic field MF forms with the reference direction with respect to the amount of variation in the relative position P12, thereby increasing the sensitivity for position detection. This will be described below with reference to a position detection device of a comparative example.

Figure 10:
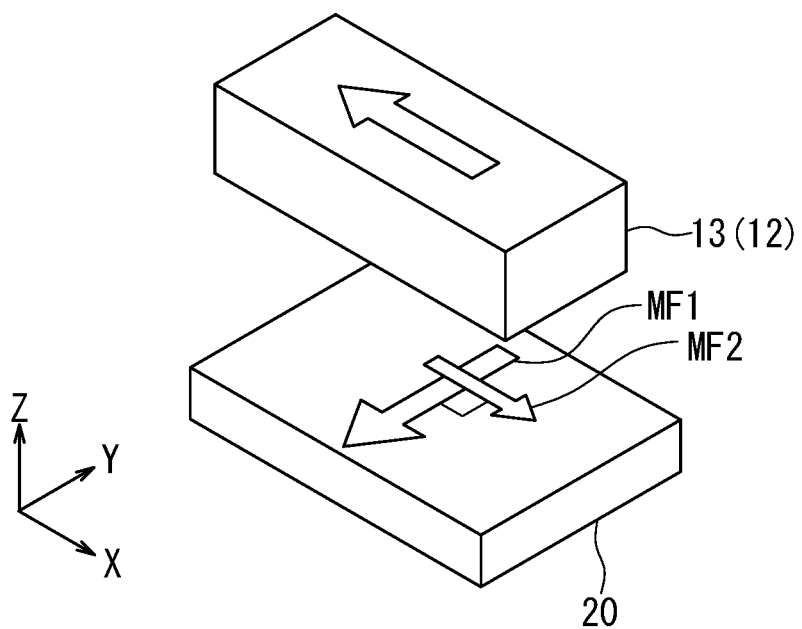
FIG. 10 is a perspective view illustrating the principal parts of a position detection device of a comparative example.

First, reference is made to FIG. 10 to describe the configuration of the position detection device of the comparative example. FIG. 10 is a perspective view illustrating the principal parts of the position detection device of the comparative example. The position detection device of the comparative example has basically the same configuration as the position detection device 1 according to the present embodiment. In the comparative example, however, the first magnetic field generation unit 11, the second magnetic field generation unit 12 and the magnetic sensor 20 are provided to obtain a relative angle θ of 90°. To be more specific, the magnet 13 of the second magnetic field generation unit 12 is disposed in such an orientation that the magnetization of the magnet 13 is in the −X direction.

Figure 11:
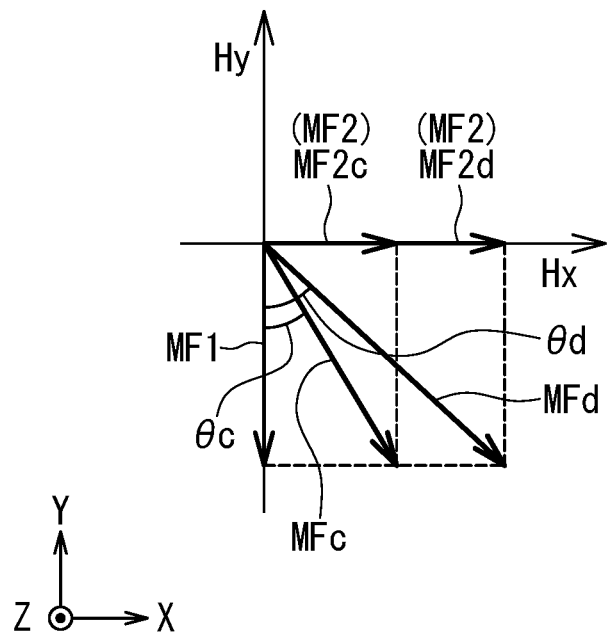
FIG. 11 is an explanatory diagram illustrating a first magnetic field, a second magnetic field, and a composite magnetic field of the comparative example.

Next, reference is made to FIG. 11 to describe a first magnetic field MF1, a second magnetic field MF2 and a composite magnetic field in the comparative example at the detection position. In FIG. 11, the X-directional axis represents the strength Hx of a magnetic field in the X direction, and the Y-directional axis represents the strength Hy of a magnetic field in the Y direction. For the comparative example, the second magnetic field MF2 at the detection position in the case where the distance between the detection position and the second magnetic field generation unit 12 is relatively large will be referred to as a magnetic field MF2c, and the second magnetic field MF2 at the detection position in the case where the distance between the detection position and the second magnetic field generation unit 12 is relatively small will be referred to as a magnetic field MF2d. As shown in FIG. 11, the magnetic field MF2d is higher in strength than the magnetic field MF2c. The magnetic field MF2c and the magnetic field MF2d are in the same direction. The angle that the magnetic field MF2c forms with the first magnetic field MF1 at the detection position and the angle that the magnetic field MF2d forms with the first magnetic field MF1 at the detection position are both 90°.

Here, MFc represents a composite magnetic field of the magnetic field MF2c and the first magnetic field MF1 at the detection position; MFd represents a composite magnetic field of the magnetic field MF2d and the first magnetic field MF1 at the detection position; θc represents the angle that the direction of the composite magnetic field MFc forms with the −Y direction, i.e., the reference direction; and θd represents the angle that the direction of the composite magnetic field MFd forms with the −Y direction, i.e., the reference direction.

Assume that the strengths of the first magnetic field MF1, the magnetic field MF2c and the magnetic field MF2d shown in FIG. 11 are equal to the strengths of the first magnetic field MF1, the magnetic field MF2a and the magnetic field MF2b shown in FIG. 9, respectively. As shown in FIG. 9 and FIG. 11, a difference θab between the angle θa and the angle θb is greater than a difference θcd between the angle θc and the angle θd. The differences θab and θcd correspond to the amount of variation in the angle that the direction of the composite magnetic field MF forms with the reference direction with respect to the amount of variation in the relative position P12. The present embodiment allows the amount of variation in the aforementioned angle to be greater than in the comparative example.

Figure 12:
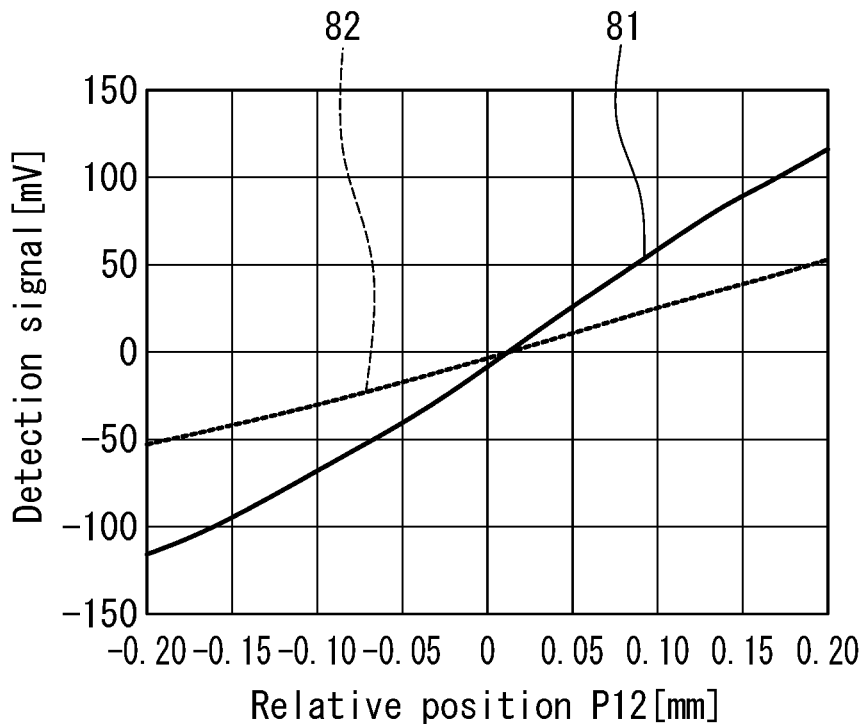
FIG. 12 is a characteristic diagram illustrating example output characteristics of the position detection device according to the first embodiment of the invention and the position detection device of the comparative example.

Reference is now made to FIG. 12 to describe the relationship between the relative position P12 and the detection signal, which will hereinafter be referred to as the output characteristic, for the position detection device 1 according to the present embodiment and the position detection device of the comparative example. In FIG. 12, the horizontal axis represents the relative position P12, and the vertical axis represents the value of the detection signal. Here, the range over which the second magnetic field generation unit 12 is movable when moved in a direction parallel to the Z direction will be referred to as the movable range of the second magnetic field generation unit 12. In FIG. 12, with the origin point of the horizontal axis set at a relative position P12 corresponding to the center of the movable range, a relative position P12 located forward of the origin point in the −Z direction is expressed in a negative value, and a relative position P12 located forward of the origin point in the Z direction is expressed in a positive value. In FIG. 12, the curve 81 represents the output characteristic of the position detection device 1 according to the present embodiment, and the curve 82 represents the output characteristic of the position detection device of the comparative example. Here, the relative angle θ in the position detection device 1 according to the present embodiment is set at 135°.

As shown in FIG. 12, given the same amount of variation in the relative position P12, the detection signal of the position detection device 1 according to the present embodiment shows a greater amount of variation than the detection signal of the position detection device of the comparative example. Thus, when compared with the comparative example, the present embodiment provides a greater amount of variation in the detection signal with respect to the amount of variation in the relative position P12. Here, the ratio of the amount of variation in the detection signal to the amount of variation in the relative position P12 in the entire movable range will be defined as the sensitivity for position detection. In the example shown in FIG. 12, the sensitivity of the position detection device 1 according to the present embodiment is approximately 600 mV/mm, whereas the sensitivity of the position detection device of the comparative example is approximately 250 mV/mm.

Thus, the present embodiment enables increasing the sensitivity for position detection by increasing the amount of variation in the angle that the direction of the composite magnetic field MF forms with the reference direction with respect to the amount of variation in the relative position P12.

When the relative angle θ is smaller than 90°, the angle that the direction of the composite magnetic field MF forms with the −Y direction, i.e., the reference direction, becomes smaller than that in the case where the relative angle θ is 90°. When the relative angle is 180°, the angle that the direction of the composite magnetic field MF forms with the −Y direction, i.e., the reference direction, has a constant value, thus failing to generate a detection signal that varies according to the amount of variation in the relative position P12. In view of these facts, in the present embodiment the relative angle θ is set to a value within the range greater than 90° and smaller than 180°.

Further, in the present embodiment, the relative angle θ preferably falls within the range of 105° to 165°, and more preferably within the range of 105° to 145°. The reason therefor will be described below.

Figure 13:
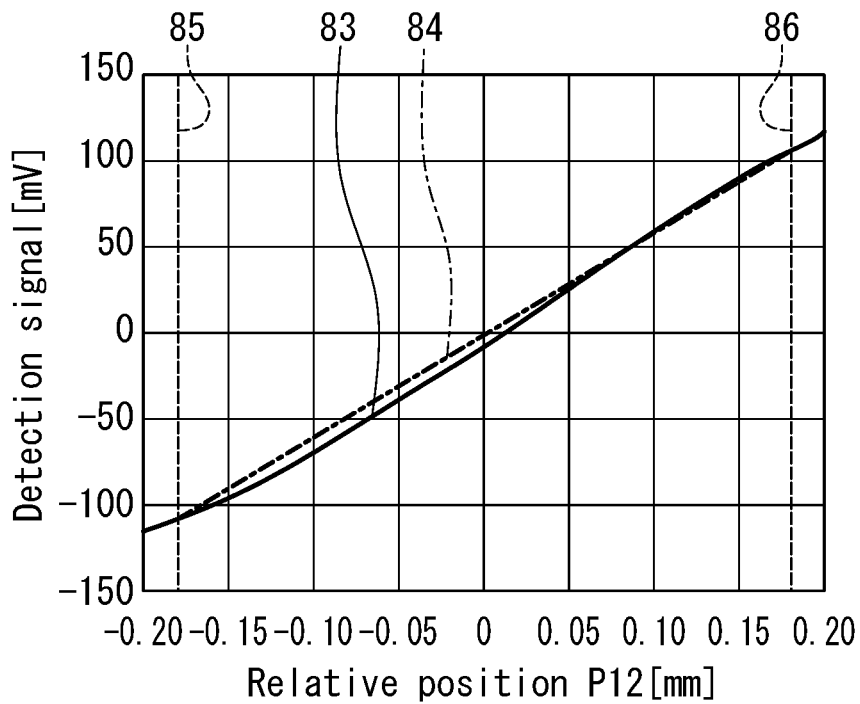
FIG. 13 is a characteristic diagram illustrating an example output characteristic of the position detection device according to the first embodiment of the invention.

Linearity is one of indicators of the performance of the position detection device 1. The linearity will be described with reference to FIG. 13. FIG. 13 is a characteristic diagram illustrating an example output characteristic of the position detection device 1 according to the present embodiment. In FIG. 13, the horizontal axis represents the relative position P12, and the vertical axis represents the value of the detection signal. The definition of the origin point of the horizontal axis and the definitions of the positive and negative values of the relative position P12 in FIG. 13 are the same as those in FIG. 12. In FIG. 13, the curve 83 represents the output characteristic. The output characteristic shown in FIG. 13 is the same as that of the position detection device 1 according to the present embodiment shown in FIG. 12. The straight line 84 is an ideal line representing an ideal output characteristic. Here, the ideal line is a straight line connecting the value of the detection signal at a relative position P12 corresponding to the lower limit of the movable range of the second magnetic field generation unit 12 and the value of the detection signal at a relative position P12 corresponding to the upper limit of the movable range of the second magnetic field generation unit 12. The position of the straight line 85 represents the relative position P12 corresponding to the lower limit of the movable range, and the position of the straight line 86 represents the relative position P12 corresponding to the upper limit of the movable range.

Let Zv represent the value of the actual relative position P12 corresponding to the value of any given detection signal. Let Zf represent the value of the relative position P12 located on the ideal line and corresponding to the value of the aforementioned given detection signal. In the present embodiment, the absolute value |Zv−Zf| of the difference between Zv and Zf is defined as parameter D, which is a parameter related to linearity. The smaller the value of the parameter D over the entire movable range, the better the linearity.

Figure 14:
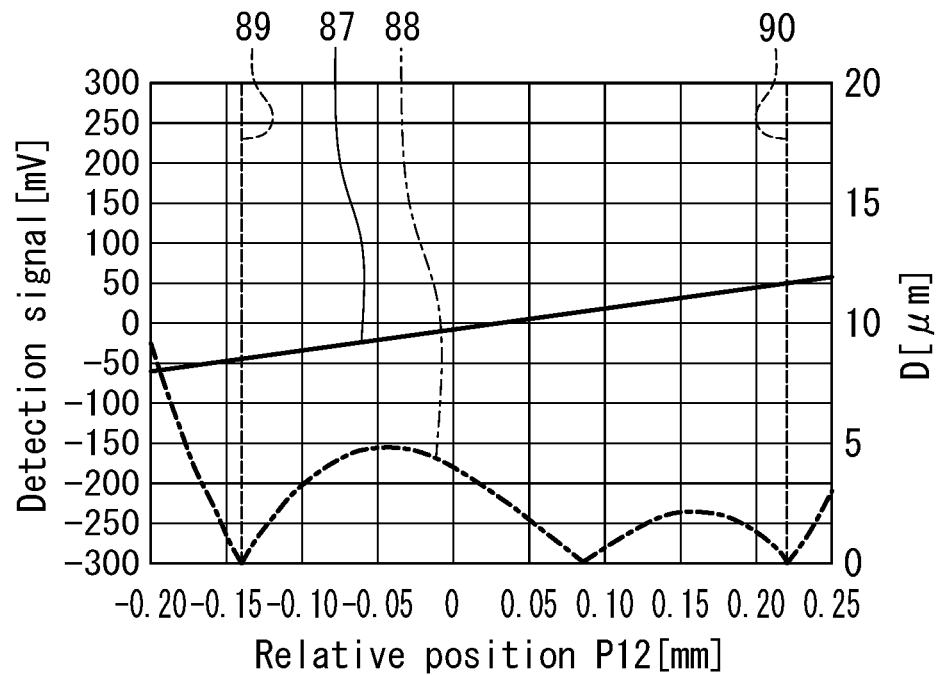
FIG. 14 is a characteristic diagram illustrating example values of a parameter related to the linearity in the entire movable range of a second magnetic field generation unit.

FIG. 14 shows an example of values of the parameter D in the entire movable range. The characteristic of the parameter D shown in FIG. 14 was obtained from the output characteristic of the position detection device of the comparative example shown in FIG. 12. In FIG. 14 the horizontal axis represents the relative position P12, the vertical axis on the left represents the value of the detection signal, and the vertical axis on the right represents the value of the parameter D. The definition of the origin point of the horizontal axis and the definitions of the positive and negative values of the relative position P12 in FIG. 14 are the same as those in FIG. 12. In FIG. 14, the curve 87 represents the output characteristic of the position detection device of the comparative example, the curve 88 represents the characteristic of the parameter D, the position of the straight line 89 represents the relative position P12 corresponding to the lower limit of the movable range, and the position of the straight line 90 represents the relative position P12 corresponding to the upper limit of the movable range. The output characteristic shown in FIG. 14 is the same as that of the position detection device of the comparative example shown in FIG. 12. In the example shown in FIG. 14, the value of the parameter D in the movable range is 5 μm or less.

The difference between the value of the detection signal at the relative position P12 corresponding to the lower limit of the movable range and the value of the detection signal at the relative position P12 corresponding to the upper limit of the movable range will be referred to as detection signal range. The detection signal range and linearity vary depending on the relative angle θ. Here, an angle that is formed by the direction of the second magnetic field MF2 with the direction of the first magnetic field MF1 at the detection position and is expressed in values within the range of −180° to 180° will be referred to as signed relative angle θs. The signed relative angle θs is expressed in positive values when the direction of the second magnetic field MF2 falls within the range of 0° to 180° relative to the direction of the first magnetic field MF1 in a counterclockwise direction as viewed from above. The signed relative angle θs is expressed in negative values when the direction of the second magnetic field MF2 falls within the range of 0° to 180° relative to the direction of the first magnetic field MF1 in a clockwise direction as viewed from above. The relative angle θ is the absolute value of the signed relative angle θs.

Figure 15:
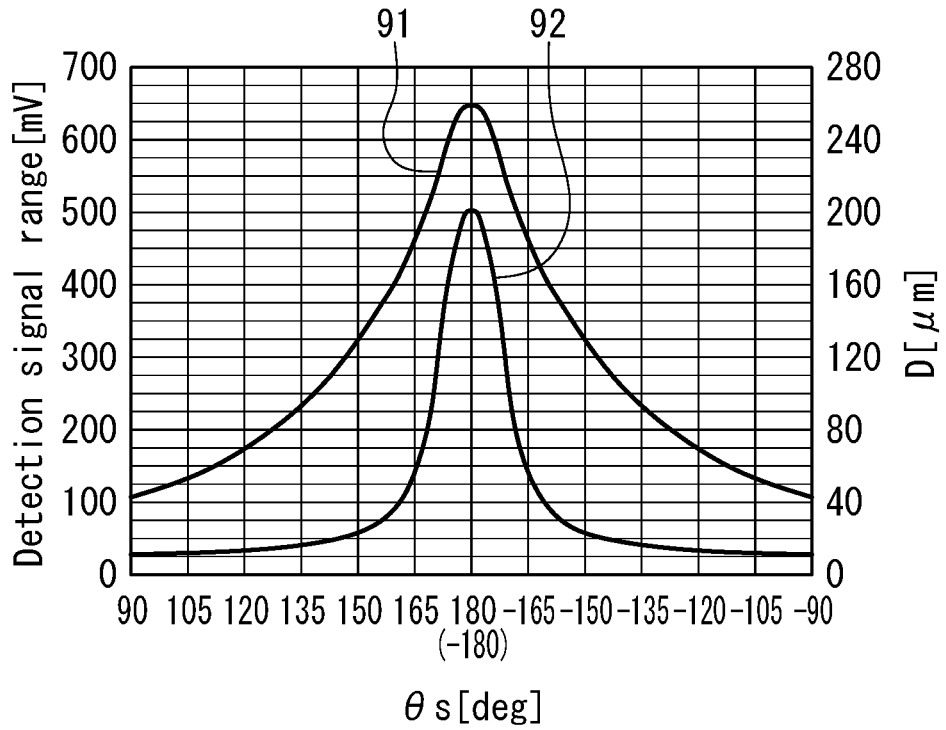
FIG. 15 is a characteristic diagram illustrating the dependencies of a detection signal range and the parameter related to the linearity on the relative angle in the position detection device according to the first embodiment of the invention.

FIG. 15 shows the dependencies of the detection signal range and the parameter D on the relative angle at a predetermined relative position P12. In FIG. 15 the horizontal axis represents the singed relative angle θs, the vertical axis on the left represents the value of the detection signal range, and the vertical axis on the right represents the value of the parameter D. In FIG. 15, the curve 91 represents the dependency of the detection signal range on the signed relative angle θs, and the curve 92 represents the dependency of the parameter D on the signed relative angle θs.

As shown in FIG. 15, the detection signal range increases as the absolute value of the signed relative angle θs increases from 90°, and is maximized when the absolute value of the signed relative angle θs is 180°. The detection signal range is preferably large to some extent. To be more specific, the detection signal range is preferably larger by at least 25% than in the case where the absolute value of the signed relative angle θs is 90°. As shown in FIG. 15, this condition is satisfied when the absolute value of the signed relative angle θs is 105° or more.

As shown in FIG. 15, the parameter D increases as the absolute value of the signed relative angle θs increases from 90°, and is maximized when the absolute value of the signed relative angle θs is 180°. The parameter D is preferably 50 µm or less, and more preferably 20 µm or less. FIG. 15 shows that when the absolute value of the signed relative angle θs is 165° or less, the parameter value D is 50 µm or less, and when the absolute value of the signed relative angle θs is 145° or less, the parameter value D is 20 µm or less.

As mentioned above, the relative angle θ is the absolute value of the signed relative angle θs. Thus, the relative angle θ is preferably within the range of 105° to 165°, and more preferably within the range of 105° to 145°.

Modification Examples

Figure 16:
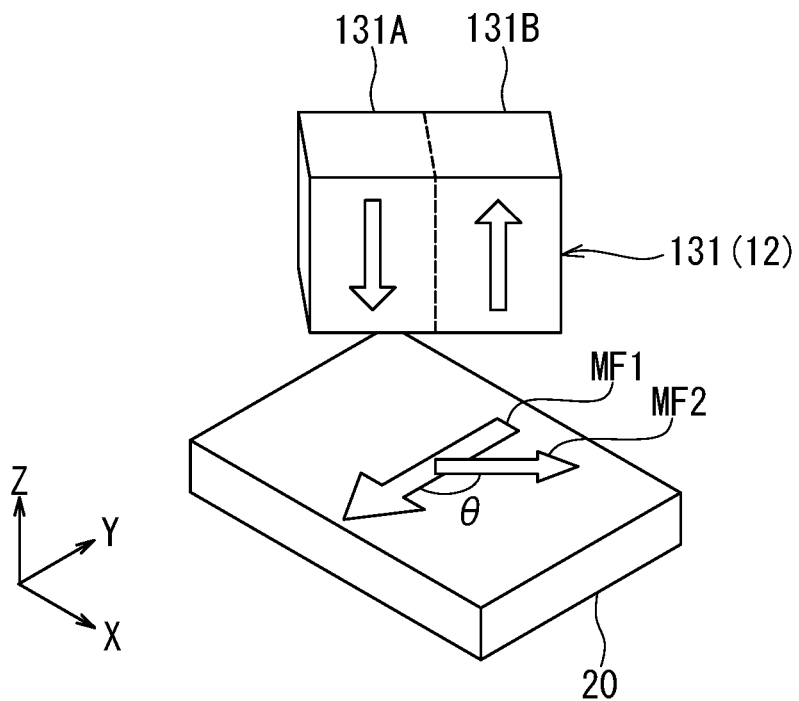
FIG. 16 is a perspective view illustrating a first modification example of the second magnetic field generation unit of the first embodiment of the invention.

A first to a third modification example of the second magnetic field generation unit 12 of the present embodiment will now be described. First, reference is made to FIG. 16 to describe the first modification example. FIG. 16 is a perspective view illustrating the first modification example of the second magnetic field generation unit 12. In the first modification example, the second magnetic field generation unit 12 has a magnet 131, instead of the magnet 13. The second magnetic field MF2 in the first modification example is a magnetic field generated by the magnet 131. The magnet 131 is shaped like a rectangular solid. The magnet 131 is fixed to the second holding member 15 in the space near the end face 31A1 of the magnet 31A and the end face 34A1 of the magnet 34A shown in FIG. 3.

As shown in FIG. 16, the magnet 131 includes a first portion 131A and a second portion 131B. In FIG. 16 the boundary between the first portion 131A and the second portion 131B is indicated in broken lines. In FIG. 16 the arrow drawn within the first portion 131A indicates the magnetization direction of the first portion 131A, and the arrow drawn within the second portion 131B indicates the magnetization direction of the second portion 131B. The magnetization direction of the first portion 131A is the −Z direction. The magnetization direction of the second portion 131B is the Z direction. In the example shown in FIG. 16, the relative angle θ is 135°.

Figure 17:
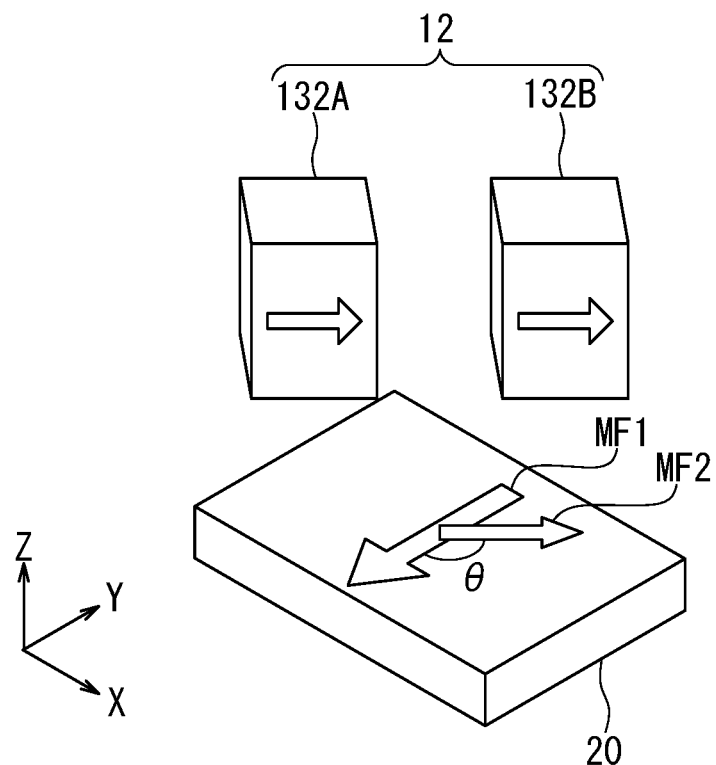
FIG. 17 is a perspective view illustrating a second modification example of the second magnetic field generation unit of the first embodiment of the invention.

Next, the second modification example will be described with reference to FIG. 17. FIG. 17 is a perspective view illustrating the second modification example of the second magnetic field generation unit 12. In the second modification example, as shown in FIG. 17, the second magnetic field generation unit 12 has two magnets 132A and 132B, instead of the magnet 13. The two magnets 132A and 132B are located at a predetermined distance from each other. The second magnetic field MF2 in the second modification example is a composite of magnetic fields generated by the two magnets 132A and 132B. Each of the magnets 132A and 132B is shaped like a rectangular solid. The magnets 132A and 132B are fixed to the second holding member 15 in the space near the end face 31A1 of the magnet 31A and the end face 34A1 of the magnet 34A shown in FIG. 3.

In FIG. 17 the arrow drawn within the magnet 132A indicates the magnetization direction of the magnet 132A, and the arrow drawn within the magnet 132B indicates the magnetization direction of the magnet 132B. The magnetization direction of each of the magnets 132A and 132B is one direction parallel to the direction in which the magnets 132A and 132B are aligned. In the example shown in FIG. 17, the relative angle θ is 135°.

Figure 18:
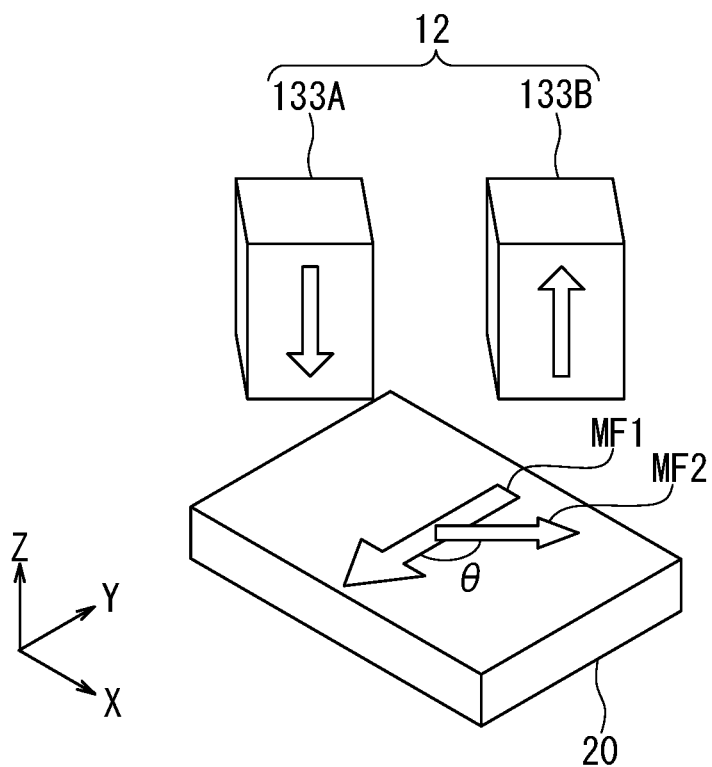
FIG. 18 is a perspective view illustrating a third modification example of the second magnetic field generation unit of the first embodiment of the invention.

Next, the third modification example will be described with reference to FIG. 18. FIG. 18 is a perspective view illustrating the third modification example of the second magnetic field generation unit 12. In the third modification example, as shown in FIG. 18, the second magnetic field generation unit 12 has two magnets 133A and 133B, instead of the magnet 13. The two magnets 133A and 133B are located at a predetermined distance from each other. The second magnetic field MF2 in the third modification example is a composite of magnetic fields generated by the two magnets 133A and 133B. Each of the magnets 133A and 133B is shaped like a rectangular solid. The magnets 133A and 133B are fixed to the second holding member 15 in the space near the end face 31A1 of the magnet 31A and the end face 34A1 of the magnet 34A shown in FIG. 3.

In FIG. 18 the arrow drawn within the magnet 133A indicates the magnetization direction of the magnet 133A, and the arrow drawn within the magnet 133B indicates the magnetization direction of the magnet 133B. The magnetization direction of the magnet 133A is the −Z direction. The magnetization direction of the magnet 133B is the Z direction. In the example shown in FIG. 18, the relative angle θ is 135°.

Second Embodiment

A second embodiment of the present invention will now be described with reference to FIG. 19. A position detection device 101 according to the second embodiment is used to detect the lens position, like the position detection device 1 according to the first embodiment. The position detection device 101 includes a first holding member 114 and a second holding member 115. The first holding member 114 is plate-shaped and has a top surface 114a.

Figure 19:
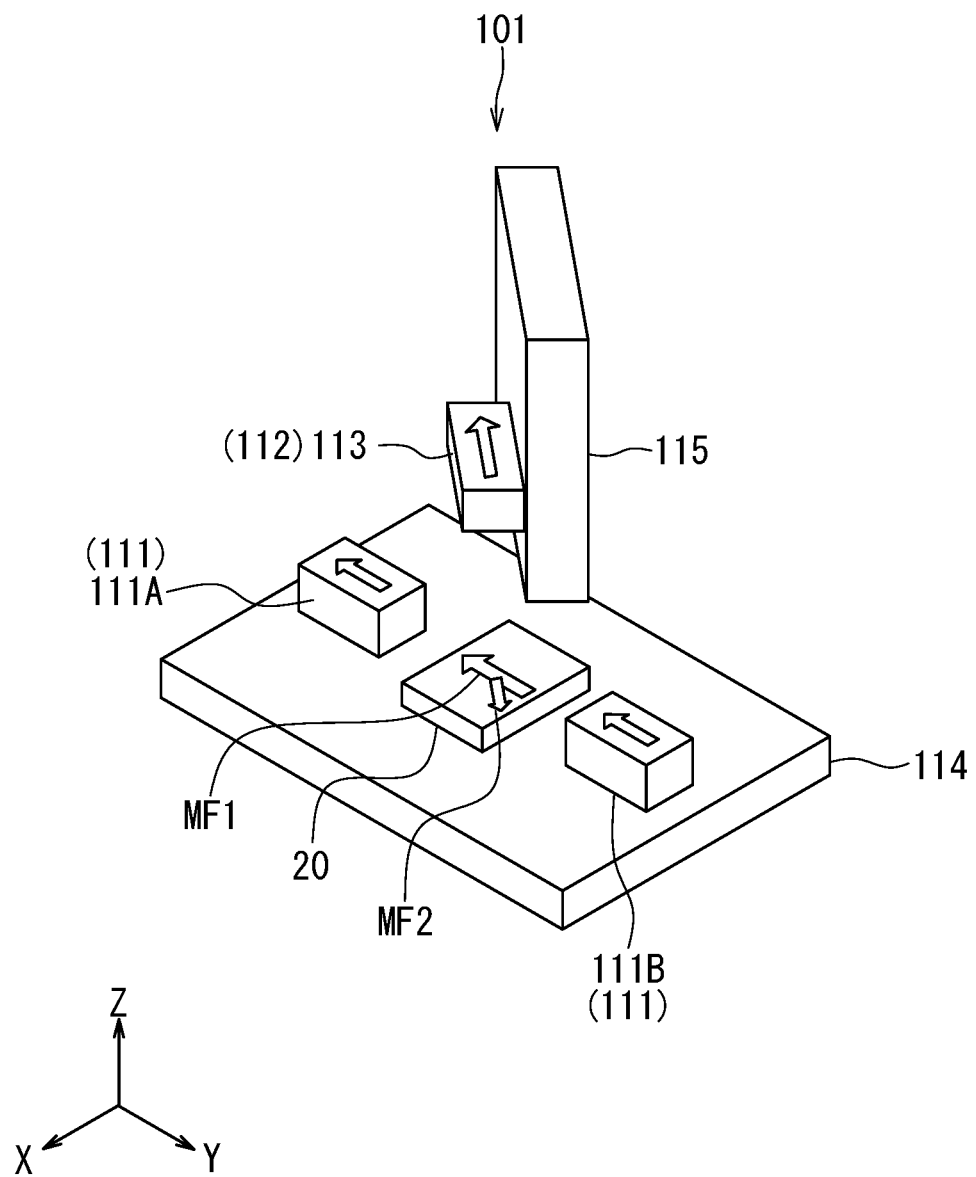
FIG. 19 is a perspective view of a position detection device according to a second embodiment of the invention.

Now, X, Y and Z directions are defined as shown in FIG. 19. The X, Y and Z directions are orthogonal to one another. In the present embodiment, the Z direction is a direction perpendicular to the top surface 114a of the first holding member 114. In FIG. 19, the Z direction is the upward direction. The X and Y directions are both parallel to the top surface 114a of the first holding member 114. Further, −X, −Y, and −Z directions refer to directions that are opposite to the X, Y, and Z directions, respectively.

The second holding member 115 is provided such that its position is variable in one direction, specifically, in a direction parallel to the Z direction, with respect to the first holding member 114. In the present embodiment, the second holding member 115 is configured to be capable of holding a lens (not illustrated). The non-illustrated lens is disposed in such an orientation that the direction of its optical axis is parallel to the Z direction. The driving device (not illustrated) is configured to be capable of moving the second holding member 115 in the direction parallel to the Z direction.

The position detection device 101 further includes a first magnetic field generation unit 111 for generating a first magnetic field MF1, a second magnetic field generation unit 112 for generating a second magnetic field MF2, and a magnetic sensor 20. The magnetic sensor 20 is fixed to the first holding member 114. The magnetic sensor 20 has basically the same configuration as that in the first embodiment. In the present embodiment, the predetermined detection position is the position where the magnetic sensor 20 is placed.

The first magnetic field generation unit 111 has two magnets 111A and 111B located at mutually different positions. The first magnetic field MF1 in the present embodiment is a composite of magnetic fields generated by the magnets 111A and 111B. Each of the magnets 111A and 111B is shaped like a rectangular solid. The magnet 111A is located forward of the magnetic sensor 20 in the −Y direction. The magnet 111B is located forward of the magnetic sensor 20 in the Y direction. The magnets 111A and 111B are fixed to the first holding member 114. The first magnetic field generation unit 111 is thus held by the first holding member 114.

The magnets 111A and 111B have magnetizations in the −Y direction. In FIG. 19, the arrows drawn within the magnets 111A and 111B indicate the magnetization direction of the magnets 111A and 111B. The first magnetic field MF1 at the detection position is also in the −Y direction. In FIG. 19 the arrow MF1 represents the first magnetic field MF1 at the detection position.

The second magnetic field generation unit 112 is provided such that its relative position with respect to the first magnetic field generation unit 111 is variable. In the present embodiment, the second magnetic field generation unit 112 has a magnet 113. The second magnetic field MF2 is a magnetic field generated by the magnet 113. The magnet 113 is shaped like a rectangular solid. The magnet 113 is fixed to the second holding member 115 at a position above the magnetic sensor 20. The second magnetic field generation unit 112 is thus held by the second holding member 115. When the relative position of the second holding member 115 with respect to the first holding member 114 varies in a direction parallel to the Z direction, the relative position of the second magnetic field generation unit 112 with respect to the first magnetic field generation unit 111 also varies in the direction parallel to the Z direction.

In FIG. 19, the arrow MF2 represents the second magnetic field MF2 at the detection position. The first magnetic field generation unit 111, the second magnetic field generation unit 112 and the magnetic sensor 20 are provided such that the relative angle formed by the direction of the second magnetic field MF2 with the direction of the first magnetic field MF1 is greater than 90° and smaller than 180°. In the present embodiment, the relative angle is adjustable by adjusting the orientation of the magnet 113. FIG. 19 illustrates an example in which the relative angle θ is set at 135°. In this example, the magnet 113 is disposed in such an orientation that the magnetization of the magnet 113 is in the direction rotated by 45° from the −X direction toward the −Y direction. In FIG. 19, the arrow drawn within the magnet 113 indicates the magnetization direction of the magnet 113. The preferable range of the relative angle is the same as that in the first embodiment.

The other configuration, function and effects of the present embodiment are the same as those of the first embodiment.

The present invention is not limited to the foregoing embodiments, and various modifications may be made thereto. For example, as far as the requirements of the appended claims are met, the shapes and locations of the first and second magnetic field generation units and the location of the magnetic sensor 20 are not limited to the respective examples illustrated in the foregoing embodiments, but can be freely chosen.

The position detection device of the present invention is usable to detect not only a lens position but also the position of any object moving in a predetermined direction.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device for detecting a position of an object moving in a predetermined direction, the position detection device comprising:
a first magnetic field generation unit for generating a first magnetic field;
a second magnetic field generation unit for generating a second magnetic field, the second magnetic field generation unit being provided such that its relative position with respect to the first magnetic field generation unit is variable; and
a magnetic sensor for detecting a magnetic field to be detected at a predetermined detection position and generating a detection signal corresponding to a direction of the magnetic field detected, the magnetic field to be detected being a composite magnetic field of the first magnetic field and the second magnetic field at the predetermined detection position, wherein
the second magnetic field generation unit is configured so that its relative position with respect to the first magnetic field generation unit varies in response to a variation in the position of the object,
varying the relative position of the second magnetic field generation unit with respect to the first magnetic field generation unit does not vary a strength or direction of the first magnetic field at the detection position or a direction of the second magnetic field at the detection position, but varies a strength of the second magnetic field at the detection position, and
at the detection position, a relative angle formed by the direction of the second magnetic field with the direction of the first magnetic field is greater than 90° and smaller than 180°.

2. The position detection device according to claim 1, wherein the relative angle falls within a range of 105° to 165°.

3. The position detection device according to claim 1, wherein the relative angle falls within a range of 105° to 145°.

4. The position detection device according to claim 1, wherein varying the relative position of the second magnetic field generation unit with respect to the first magnetic field generation unit varies a distance between the detection position and the second magnetic field generation unit.

5. The position detection device according to claim 1, wherein
the first magnetic field generation unit includes two magnets located at mutually different positions, and
the first magnetic field is a composite of two magnetic fields generated by the two magnets.

6. The position detection device according to claim 1, further comprising a first holding member for holding the first magnetic field generation unit, and a second holding member for holding the second magnetic field generation unit, the second holding member being provided such that its position is variable in one direction with respect to the first holding member.

7. The position detection device according to claim 6, wherein the object is a lens and the second holding member is configured to hold the lens, and is provided to be variable in position with respect to the first holding member, the position of the second holding member being variable in a direction of an optical axis of the lens.

* * * * *